United States Patent [19]

Richter et al.

[11] Patent Number: 5,479,704
[45] Date of Patent: Jan. 2, 1996

[54] PROCESS FOR REPAIRING DAMAGED BLADES OF TURBOENGINES

[75] Inventors: Karl-Hermann Richter, Indersdorf; Reinhold Meier, Dorfen-Stadt; Thilo Schmitt, Munich; Bernd Stimper, Dachau, all of Germany

[73] Assignee: MTU Motoren-und Turbinen Union München GmbH, Munich, Germany

[21] Appl. No.: 286,695

[22] Filed: Aug. 5, 1994

[30] Foreign Application Priority Data

Aug. 13, 1993 [DE] Germany .................. 43 27 189.8

[51] Int. Cl.⁶ .................................. B23P 15/00
[52] U.S. Cl. .................. 29/889.1; 29/889.7; 228/119
[58] Field of Search ................ 29/889.1, 889.7, 29/428, 402.07, 402.18; 219/121.85; 228/119

[56] References Cited

U.S. PATENT DOCUMENTS

| | | | |
|---|---|---|---|
| 4,832,252 | 5/1989 | Fraser | 228/119 |
| 4,873,751 | 10/1989 | Walker et al. | 29/889.1 |
| 4,883,216 | 11/1989 | Patsfall | 29/889.1 |
| 5,031,313 | 7/1991 | Blan et al. | 29/889.7 |
| 5,062,205 | 11/1991 | Fraser | 228/119 |
| 5,092,942 | 3/1992 | Fraser et al. | 29/402.18 |
| 5,142,778 | 9/1992 | Smolinski et al. | 228/119 |
| 5,188,275 | 2/1993 | Daines | 29/889.1 |
| 5,351,395 | 10/1994 | Crawmer et al. | 29/889.1 |

FOREIGN PATENT DOCUMENTS 0392656 of 0000 European Pat. Off. .

OTHER PUBLICATIONS

Jürgens, W. "Situation of welding in engine maintenance", German Society for Welding Technology, Report Series 85, 1978, pp. 72–79. (DVS–(Deutscher Verband für (Schweisstechnik) Berichtsband 85, 1978, S. 72 ff).

German Industrial Standard DIN 65 118, Part 2, p. 7, Table 3. (in German).

*Primary Examiner*—Irene Cuda
*Attorney, Agent, or Firm*—Ladas & Parry

[57] ABSTRACT

A repair process for blades of turboengines damaged in the head or edge regions in which the damaged regions are first separated to leave an undamaged blade stump with an exposed, repair surface. The repair surface of the blade stump is prepared for butt welding and a repair plate of constant thickness which exceeds the maximum profile height of the blade by more than 50% is provided with a front surface adapted to the repair surface. This front surface of the repair plate is abutted against the repair surface and the blade stump and the repair blade are then butt welded. The weld joint and the repair plate are machined to the profile contour of the blade stump and to the desired blade profile. This process is used for the repair of blades of integral rotor disks of turboengines, particularly for blades of integral compressor impellers.

20 Claims, 3 Drawing Sheets

PROCESS FOR REPAIRING DAMAGED BLADES OF TURBOENGINES

FIELD OF THE INVENTION

The invention relates to a process for repairing damaged blades of turboengines, such turbine blades, fan blades or compressor blades.

More particularly, in the process, the damaged portion of the blade is separated to leave a stump of sound material and a repair plate is butt welded to the stump at the exposed surface where the damaged portion was removed.

In general, the separation of the damaged portion depends on how and where the blade is damaged. For blade damage along the leading or trailing edges of the blade, oblique cuts are made along the leading or trailing edges, while for damage over the body of the blade, a transverse or crosswise cut is made across the blade, and for a local damage at the leading or trailing edge, an approximately semi-circular cut is made at the edge to remove the damaged part.

BACKGROUND AND CITED ART

A process is disclosed for the repair of fan blades of turboengines made of titanium in the publication "State of the Art in Repair of Drive Mechanisms", German Society for Welding Technology, Report Series 85, 1978, pages 72 to 79. In this process, weld filler strips conforming to the cut edge of the blade stump and edge members of weld filler or the material of the weld stump are positioned at the cut edge of the blade and a repair plate that is at least the thickness of the separated and damaged blade region, is positioned adjacent to the cut edge, the facing surface of the repair plate accurately conforming to the weld filler strips and the edge members whereupon an electron beam welding operation is carried out, whereby the weld filler strips and the edge members are welded partially or completely along with the facing surface of the repair plate to the blade stump.

An essential disadvantage of this repair process is that it is unsuitable for the repair of many small and ultrasmall blades, for example, of compressor blades for turbines, due to the expensive preparation of four to five shaped pieces for the repair of one single damaged blade part. For a commercially justifiable repair of structural parts of turboengines, it is necessary that the repair costs remain below approximately 60% of the manufacturing cost of the structural part. This is satisfied in the above process for large size fan blades of titanium with its corresponding high material and finishing costs, but cannot be achieved in the case of small size structural parts.

EPA-0-392,656 discloses that an accurately adapted replacement part which has a profile thickness corresponding to the damaged region for repair of turbine blades, which is then welded to the blade stump with an X seam. One disadvantage of this process is the need for accurate production of the replacement part and a further disadvantage is the requirement for a filler material, which must be introduced into the weld seam.

DIN 65 118, Part 2, page 7, table 3 requires that for a butt weld, the repair plate to be welded on should not exceed an established overdimension of 50%, between the joined structural parts especially in the case of highly stressed parts. Consequently, when welding repair plates to blade stumps, either the repair plate must accurately conform to the contour of the blade stump before welding or it may project beyond the contour up to the maximum given overdimension. The application of this standard is a problem in the region of the leading and trailing edges of the blade where the profile thickness reduces to zero. Here expensive processing methods must take care that the repair plate extending along the contour of the blade stump does not project beyond the permissible overdimension.

If welding is conducted, without overdimensioning, with a repair plate of a profile corresponding to that of the blade stump and without a weld filler, then serious flaws result. These include formation of edge notches at both sides of the weld joint. In the region of the trailing and leading edges of the blade, high instabilities of the formed pool of weld material occur due to the diminution of the thickness of the blade to zero, despite complex and expensive control of the welding parameters as a function of the variation of the profile thickness of the blade stump. This may lead to sagging of the weld pool and to separation of material from the weld pool. Under certain conditions, the weld pool must be prevented at the edges from sagging and separation by support from flow by shaped mold parts. This is a great disadvantage. The filler material, which fills the edge notches forms a raised weld bead which must subsequently be machined in order to obtain a smooth, continuous transition between the profile of the blade stump and that of the profiled repair plate.

A further disadvantage in the butt welding of profiled repair plate, which conform to the profile of the blade stump, is the unavoidable distortion of both the blade stump and the profiled repair plate in the case of blades of small thickness, particularly compressor blades. In addition to machining off the weld bead an expensive realignment of the repaired blade is necessary.

SUMMARY OF THE INVENTION

An object of the invention is to provide a process for repairing damaged blades of a turboengine which overcomes the disadvantages of the known art.

A further object is to provide such a process which essentially simplifies the known processes and provides cost-favorable repairs for blades of turboengines without expensive preparation or the need for adaptor parts.

A feature of the invention is that complex programs, which are necessary for control of automatic welding machines for butt welding of structural parts with variations in thickness, become unnecessary in the process of the invention.

The above objects of feature are achieved according to the process of the invention by closely abutting against the exposed surface of the blade stump at which the damaged portion has been separated, a repair plate of constant thickness exceeding the maximum profile height of the blade by more than 50% whereafter the blade stump and the repair plate are butt welded, and finally the welded joint and the repair plate are machined to the profile contour of the blade stump.

In this way, the operation is advantageously conducted without addition of filler material. The maximum profile height of the blade is the maximum distance between two parallel straight lines extending tangentially at the inner and outer contour surfaces of the blade stump at the repair surface thereof.

The process of the invention has the advantage that the welding parameters during the butt welding operation are adapted only to one thickness, i.e., the constant thickness of the repair plate, and the process can be conducted independently of the profile thickness of the repair surface of the blade stump, which diminishes to zero at the leading or trailing edges, without causing instabilities of the weld pool in the region of the edges. The extremely great excess thickness of the repair plate at the edge regions, in contrast to the standardized procedures of DIN 65 118, provides a thermal equilibrium, so that the weld pool does not break or sag, but is maintained by surface tension against the oversized abutting surface of the repair plate until the solidification of the pool into welding beads in the form of fillet welds. Advantageously, this makes it unnecessary to provide shaped mold parts at the edge regions, to support the pool from below. The formation of upper and lower beads in the form of fillet welds is produced from material supplied at the repair face of the repair plate, so that advantageously no weld filler strips or edge members are necessary nor is any subsequent introduction of filler material required.

Another advantage of the repair process of the invention is that the repair plate can be welded to the blade stump in a single pass, even through the repair surface of the repair plate has a thickness that exceeds the profile height of the blade by more than 50%. Usually, the welding must be conducted in several passes for such different material thickness. The final machining of the welded repair plate to the blade profile is advantageously achieved by a cutting operation or electrochemically.

In one preferred mode of conducting the process, at least 5/9 of the supply of energy for the butt welding is directed onto the repair plate by means of an offset of the energy beam relative to the weld joint. This has the advantage that the major fraction of the weld energy does not affect the blade profile, but rather contributes to the melting of the repair surface of the repair plate at least up [to the surface of the abutting blade stump profile.

In another preferred mode of conducting the process, the repair plate which is welded to the blade stump, has a thickness of at least twice the maximum profile height of the blade stump. In this way, the butt welding according to the invention exceeds the known and standardized limits and at the same time provides a stable molten pool at the leading and trailing edge regions of the blade stump, where the thickness ratio between the repair plate and the blade stump profile substantially increases and becomes a multiple of the heretofore known limit value.

A repair plate of arc or pre-shaped curvature and constant thickness is advantageously utilized, if the blade profile has a small thickness and a relatively large chordal length, since in this case the curvature of the repair plate can be approximated to the curvature of the blade stump by a simple shaping operation.

Advantageously, the repair plate is attached by regions that are oblique to the blade edges, if blades with high profile thicknesses and great profile curvature are to be advantageously repaired. In this case, simple linearly varying functions are preferably applied to the welding parameters in the oblique regions and thus in the edge regions of the blade stump, while constant welding parameters apply in the region of constant thickness of the repair plate.

A tungsten-plasma arc welding (TPA) process is advantageously conducted in the keyhole process for the butt welding. Through the keyhole, which visibly passes along the entire length of the butt weld, the welding can be advantageously controlled over the entire profile thickness and an intense intermelting of the molten material of the blade stump at the repair surface and the molten material of the abutting surface of the repair plate can be obtained, and the formation of a weld bead, as it occurs otherwise only in fillet welds, can be obtained both in the region of the weld root as well as in the region of the surface of the weld seam.

In TPA welding, an offset or displacement of 55 to 100% with respect to the weld joint is to be maintained, so that between 55 and 100% of the arc root, and thus of the nozzle opening, is directed onto the repair plate and the remainder onto the blade stump. The maintaining of this offset can be easily and advantageously monitored through the surface of the arc root and can be automated. Changes in the welding parameters proceeding from this along the butt weld seam are not necessary, so that a simple, inexpensive, automated, and geometric guidance of the plasma nozzle can be conducted, and thus an error-free butt weld seam can result with the formation of weld beads of fillet-weld type at the face surface of the repair plate.

In another preferred mode of conducting the process, laser beam or electron beam welding is utilized for the butt welding. Although electron-beam welding is one of the most expensive butt welding procedures known for the repair of blades, it is advantageous in that it can be conducted with a high degree of purity of the welding material due to the use of an evacuated container whereby the resulting welds are substantially free from defects. In the process of the invention, the otherwise common and known weld filler strips and edge inserts, as well as accurately shaped molded parts in the edge regions used in laser-beam or electron-beam welding become unnecessary.

The laser beam, over and above this, has the advantage when compared to electron-beam welding that it can be employed without a vacuum container and in contrast to TPA welding, it has the advantage that the heat-affected zone and the melting zone are substantially smaller.

Preferably, the laser beam is also utilized fore separating the damaged blade region from the sound portion of the blade, whereby the molten fluid material at the separated surface is blown away by means of an inert gas jet, preferably nitrogen or argon. In this way, a bright metallic surface with very small roughness is advantageously made available as the repair surface, and the expensive preparation operations for the separated surface known in the art are reduced to a deburring of the cut surface or only to a post-alignment for the subsequent laser welding. If the entire repair process from separation to butt welding is conducted with a laser-beam unit, then considerable technical advantages result. The holding devices for aligning the blade stump must be changed or adjusted less frequently. The paths of progression of the laser beam for the separation can also be maintained for the butt welding, possibly with slight post alignment, for example, a transverse path offset for the laser beam. The bright metallic surface of the repair surface is made available for welding to the repair surface of the repair plate without pretreatment and directly after separation.

A sharp separation of the damaged blade region is not possible by means of blowing off the molten material in electron-beam welding, due to the vacuum conditions that are maintained, so that separation and welding must be conducted with the use of the expensive electron-beam process in separate devices and with separate processes.

Preferably, a displacement of 55 to 100% with respect to the weld joint is maintained also in the case of laser-beam or electron-beam welding, so that between 55 and 100% of the impact surface of the beam of energy impacts on the repair plate and the remainder on the blade stump.

A further improvement in the process of the invention can be obtained, if preferably, the displacement of the energy source with respect to the weld joint is greater at the edge regions of the blade stump than in the central region of the blade profile. With this improvement, only a biaxial guidance of the energy source is necessary, which, coupled with the thickness increase and decrease of the blade profile, controls the local displacement of the energy source in such a way that the displacement is first greater at the trailing edge of the blade stump, so that a higher energy component impacts against the repair plate, while the displacement is smaller toward the center of the blade, but still at least ⅝ths of the energy is directed onto the repair plate, and the displacement again becomes greater toward the leading edge, and thus more than ⅝ths of the introduced energy impacts against the repair plate. This has the advantage that less molten material remains adhered between the face of the repair plate and the repair surface of the blade stump, and this does not drop off or sag.

Preferably, a local displacement of the energy source between 75 and 100% is maintained in the edge regions and between 55 and 80% is maintained in the region of the center of the profile. The percentages refer to the arc root, which is correlated with the nozzle opening surface of a TPA nozzle or to the impact surface of a laser beam or electron beam, which impacts against the repair plate. The fine adjustment of the course of the displacement is correlated with the profile thickness and controlled by simple transverse feed relative to the weld joint, so that the remaining welding parameters can be maintained unchanged.

Since the welding process is terminated after a few seconds, preferably a seam tracking system is provided for detecting and automating the butt welding, whereby a predetermined course of a local displacement is maintained relative to the weld joint. The seam tracking system has the advantage that even curved welds, such as, for example, semicircular butt welds can be precisely produced.

A preferred use of the process consists in repair of blades for integral rotor disks of a turboengine or of disk blades mounted on the rotor disk. In this case of integral rotor disks of a turboengine, the blades and the rotor disk form a single unit which is either manufactured by a powder metallurgical technique or by electrochemically processing or by cutting from a solid material, or by being joined from individual parts. Such integral rotor disks are advantageous in terms of savings in weight and have a high material and finishing value. Since blades in the flow channel of a turboengine are more prone to damage than the rotor disks due to foreign objects, the process of the invention is particularly advantageous for the repair of blades of such integral rotor disks, and also it is simple to manipulate and cost-favorable and can be employed with a minimum number of adaptor pieces, i.e., with only one repair plate of constant thickness and minimum number of adapted surfaces, i,e,, only one surface of the repair plate and one repair surface of the blade stump.

The process of the invention may also preferably be utilized for rotor disk blades mounted on the rotor disk. Therefore, advantageously, the mounting and demounting of each individual blade is not necessary, and holding devices, which are required for separating damaged regions and for welding the repair plates, can be simplified by the defined holding means for the individual blades on the rotor disk.

A particular problem in the repair of blades of turboengines is the repair of compressor blades. In comparison to fan blades and turbine blades, these are particularly small in the high compression stages and have a small profile thickness. In addition, the number of blades per compression stage is relatively high in comparison to a fan rotor. The size of each individual blade is thus relatively small, so that the known expensive repair processes are not cost effective, and also they cannot be easily conducted due to the minimal dimensions. Since the process of the invention provides only a single and relatively simple repair plate per separation cut and it does not have demanding requirements for control of welding parameters, it is particularly economically and technically advantageous for this application.

DETAILED DESCRIPTION OF PREFERRED EMBODIMENTS

Figure 1A:
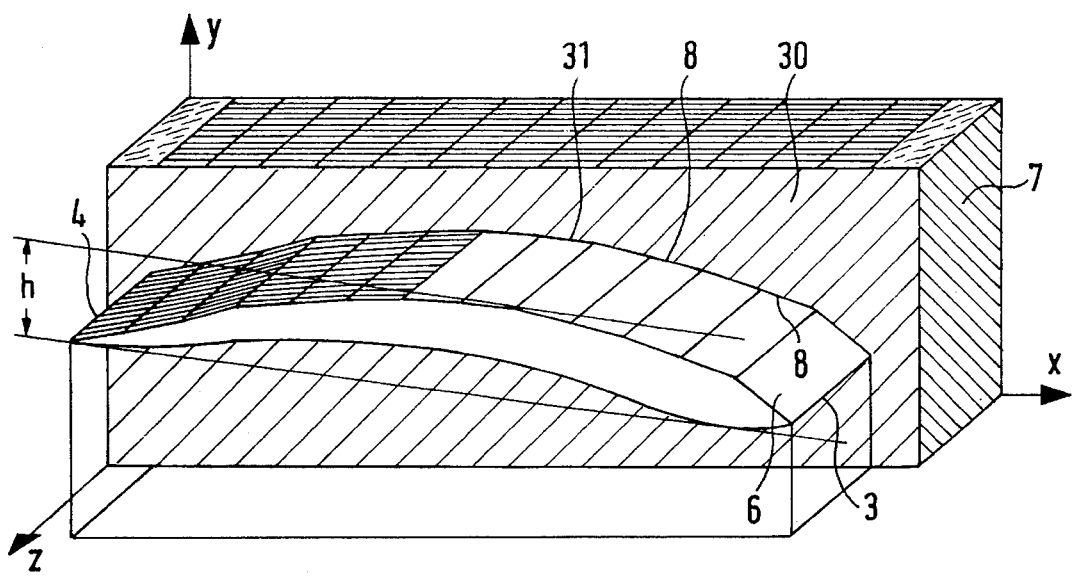
FIG. 1a is a diagrammatic, perspective view of a blade stump against which a repair plate of constant thickness is abutted.

The invention will be described in detail hereafter with reference to the following Examples and the drawing.

EXAMPLE 1

An integral rotor disk of a compressor stage of an aircraft engine made of titanium based alloy, which has damaged blades, is repaired according to the process of the invention. For this purpose one or more standardized separation cuts 10–15, are made in a pretreatment stage after damaged regions have been determined, visually or by means of crack testing of the blade.

Depending on the location of the damage on the blade to be repaired, a separation cut is made on the blade to separate the damaged portion and leave a remaining blade stump 6 of sound material. Referring to FIG. 1b therein are shown a number of standardized separation cuts 10–15 which can be made on blade 1. Separation cut 10 is transverse or crosswise relative to the longitudinal axis 5 of blade 1, separation cuts 11 and 13 are made at the leading edge of the blade, separation cuts 12 and 14 are made at the trailing edge of the blade and separation cut 15 is a local, semicircular cut shown at the trailing edge of the blade.

The standardizing of the separation cuts is obtained, on the one hand, based on the distribution of stress in the case of crosswise bending oscillations of the blades, which results in obvious regions where crack damage occurs, and, on the other hand, for reasons of accessibility for separation and joining, and finally on the basis of the occurrence of damage due to effects of foreign objects at head 2 and edge regions 3, 4 of blade 1.

Figure 2:
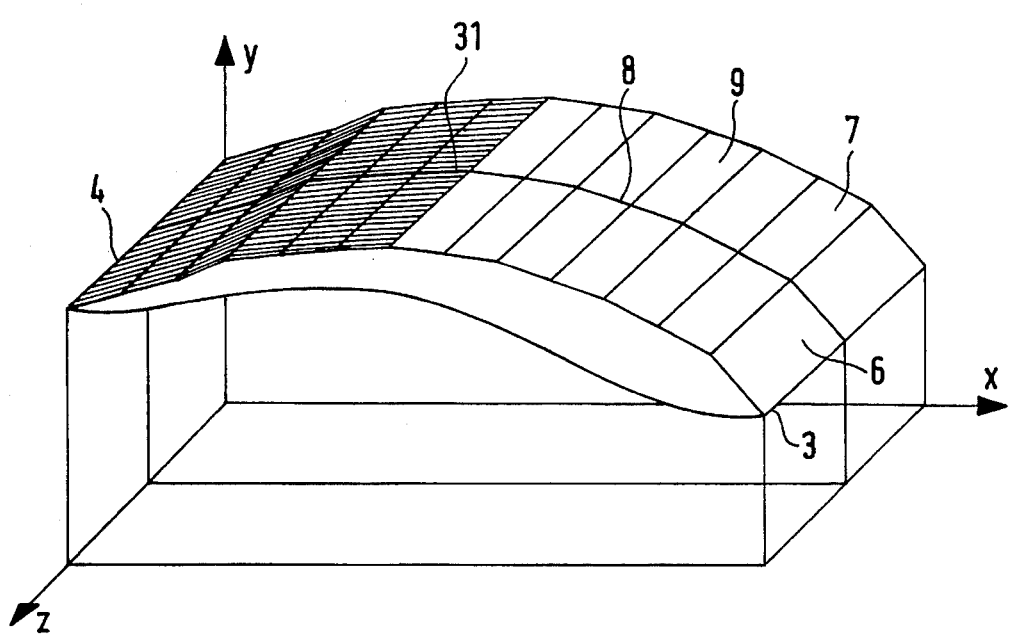
FIG. 2 is a perspective view of a blade stump with a profiled repair plate applied thereagainst in abutting relation for comparison with the invention.
Figure 1B:
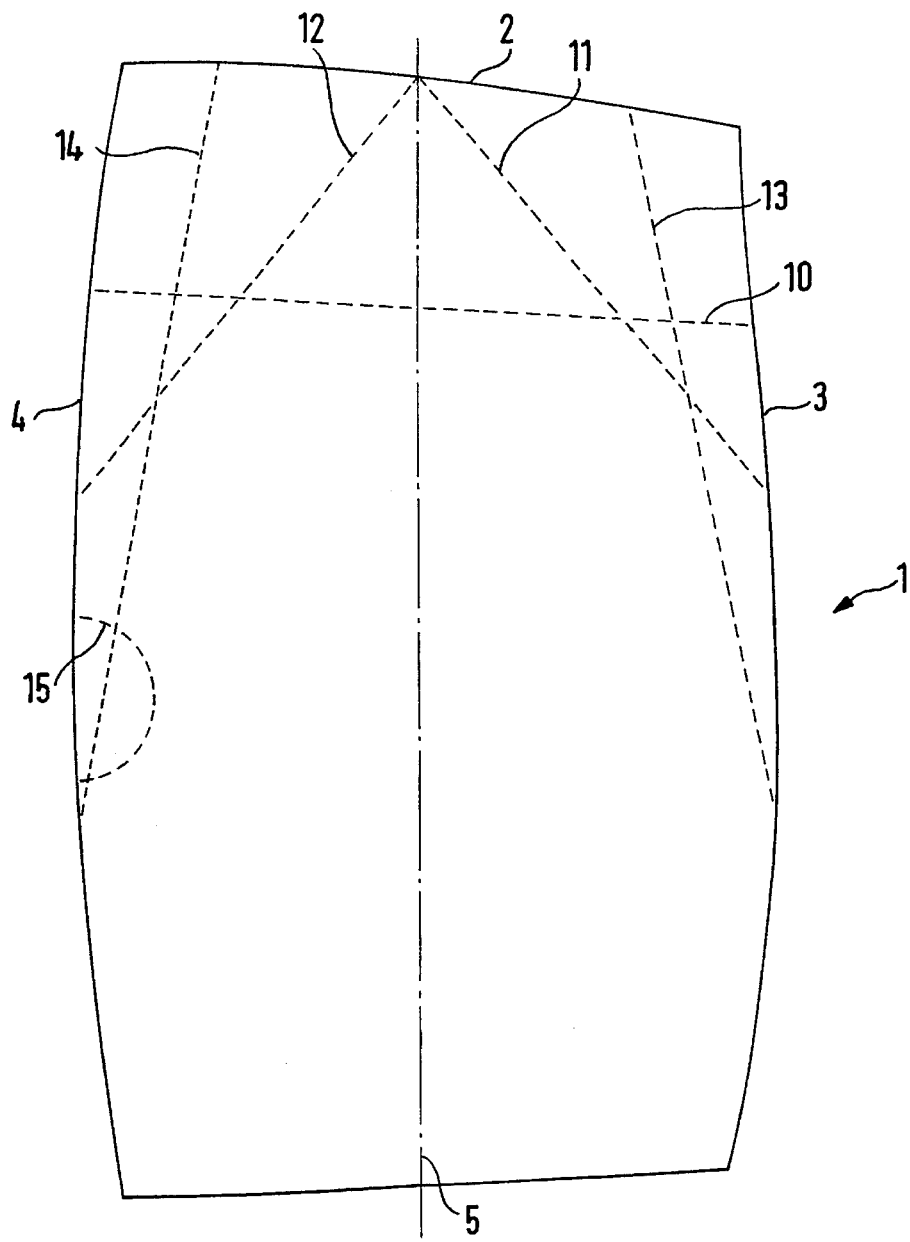
FIG. 1b is a top, plan view of a blade showing the position of various separation cuts.
Figure 1C:
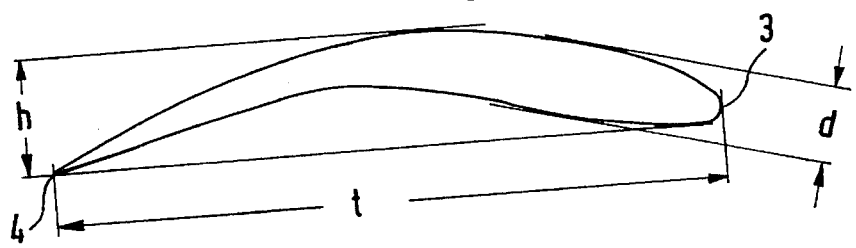
FIG. 1c is a transverse, cross section through a blade taken along separating line 10 in FIG. 1b.

The profile thickness of the blade as shown in FIG. 1c taken along separation cut 10 is defined by the distance between two parallel lines which are tangent to the upper and lower contour surfaces of the blade. The profile thickness varies depending on the location of the separation cut and in the present example for separation cut 10 is between 0 and 2.5 mm. By virtue of the change in material thickness from 0 to 2.5 mm, the processing parameters must be varied, depending on the site of the separation cut and particularly in the joining of the blade stump 6 to a repair plate 7 as shown in FIG. 2.

The standardizing of the separation cuts has the advantage that the finishing parameters for cutting and for joining are fixed and thus do not have to be adapted individually to each blade. In this way, the cost of the apparatus is minimized and the repair process is further simplified.

For pretreatment prior to repair, the damaged regions of blades 1 of turboengines damaged in the head region 2 or edge regions 3, 4 are separated to leave the undamaged blade stump 6. The separation cut 10 is essentially crosswise to the longitudinal axis 5 of the blade and essentially removes damaged portions in the head 2. The separation cuts 11–14 extend obliquely at leading edge 3 or trailing edge 4 to remove damaged portions at these edges and separation cut 15 extends approximately in semicircular manner around the damaged blade region. The separated surface of the blade, referred to as the repair surface, is either straight or approximately semicircular it is ready for butt welding and no expensive pretreatment of the repair surfaces of blade stump 6 is necessary particularly when the separation of the damaged regions is achieved by a laser beam. The invention will be described with reference to standardized cut 10 hereafter which leaves repair surface 31 exposed after the cutting operation.

Separation of the damaged portion by a laser beam is conducted in this example with a $CO_2$ laser having a maximum output power of 2.5 kW and this same laser is subsequently used for the welding operation. The laser employs the variant of high-pressure cutting in the laser separating process. In this way, the material melted by the laser beam is driven from the separation cut by a coaxial protective gas jet, for example, argon surrounding the laser beam. The blade contour at the separation site is programmed in a teach-in process and smoothed by a spline interpolation or processed in an off-line process, in order to reproducibly control the position of the repair course.

The cutting time along separation cut 10 in FIG. 1b is approximately 2 seconds for a chordal length l in FIG. 1c of 30 mm. In this way, a bright metallic, cut surface is formed transversely to the longitudinal axis 5, with the cross section shown in FIG. 1c. The average surface roughness of the repair surface 31 on the blade stump 6 lies between 1 and 1.5 µm, with a maximum roughness of 10 µm. An advantage of laser separation with the high-pressure process is that a minimum heat-affected zone is obtained in the blade stump and in the process of the invention, this heat affected zone extends from the repair surface up to 100 µm depth into the blade stump. This minimal heat-affected zone is melted in the subsequent joining and does not affect the structure of the base material in the blade stump.

The repair plate 7 in FIG. 1a has a constant thickness exceeding by more than 50% the maximum profile height h of the blade, as shown in FIG. 1c. The repair plate 7 has a front or repair surface 30 which conforms to repair surface 31 and abuts against repair surface 31. The blade stump 6 and repair plate 7 are then welded by means of butt welding. Then the weld joint and repair plate 7 are machined electrochemically or by cutting to conform to the profiled contour of blade stump 6. The contour surface of the repaired blade is smooth and continuous across the weld joint 8.

The welding of repair plate 7 was conducted in the following examples with three alternative processes on different blades of the integral rotor disk. These three processes are tungsten-plasma-arc welding (TPA) in the keyhole process, laser-beam welding in the deep beam process, and electron-beam welding.

Figure 3:
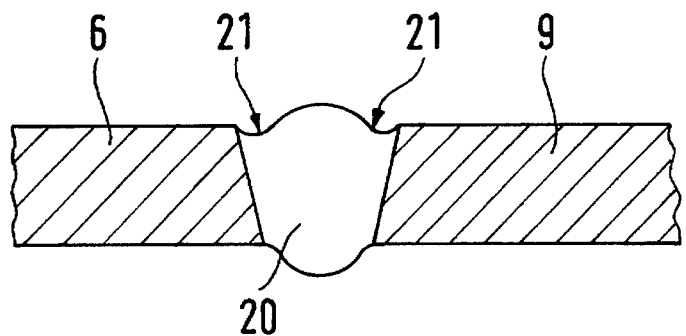
FIG. 3 is an enlarged sectional view taken through a butt weld seam joining plates of corresponding thickness without addition of weld filler for comparison with the invention.
Figure 4:
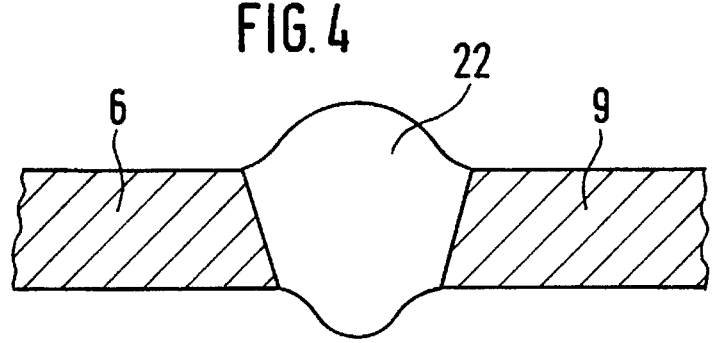
FIG. 4 is an enlarged sectional view taken through a butt weld seam joining plates of corresponding thickness with addition of weld filler for comparison with the invention.
Figure 5:
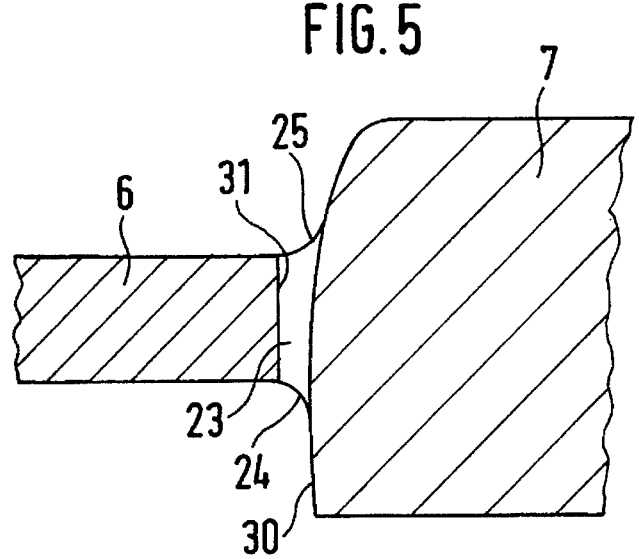
FIG. 5 is an enlarged sectional view taken through a butt weld seam joining plates of substantially different thickness without addition of weld filler.

In all three variants, the superiority of the process of the invention is demonstrated, as can be seen in FIG. 1a in combination with FIG. 5, with respect to conventional processes which require addition of weld filler, as is shown in FIGS. 3 and 4.

EXAMPLE 2

In Example 2, a compressor blade is repaired as in Example 1. Here the TPA welding method is employed as the joining technique for forming the weld joint 8. In contrast to tungsten-inert gas welding (TIG), in TPA welding, which is conducted after pretreatment of weld joint 8, the arc formed between the electrode and the workpiece is constricted by a cooled copper nozzle. In contrast to TIG welding, a more concentrated input of energy and thus a narrower weld seam and consequently a minimized heat-affected structural zone is obtained by the thus-achieved reduction of beam divergence. This advantage is supported by TPA welding in the keyhole process.

In the welding of a profiled repair plate 9 to a blade stump 6, as shown in FIG. 2 in combination with FIG. 3, however, edge notches 21 are formed over the entire length of the weld seam in the region of weld joint 20, and these notches can be eliminated only by; the use of a weld filler, such as, for example, by applying a form-fitting adaptor strip of weld filler into the weld joint, so that a subsequently processible raised weld bead 22, as shown in FIG. 4, is formed on the surface of the weld seam. With the use of a profiled repair plate 9, as shown in FIG. 2, it is necessary over and above this to vary, in a locally dependent manner, all welding parameters, such as base time, pulse time, base current, pulse current, welding speed, plasma gas flow and feed of the weld filler, and to correlate these parameters with the change in material thickness.

A distortion of the profiled repair plate 9 and blade stump 6, however, cannot be avoided due to the weld filler. At the leading and trailing edge regions of the blade where the thickness of blade stump 6 and profiled repair plate 9 diminish to zero, as shown in FIG. 2, there also exists the danger of sagging of the molten weld pool and its detachment.

In the solution of the invention, as shown in FIG. 1a, the TPA process in the keyhole process is applied onto weld joint 8 between profiled repair surface 31 on the blade stump 6 and the conforming face 30 on the repair plate 7. The height of the front surface 30 is determined by the profile height h. The height of front surface 30 exceeds the profile height h, according to the invention, by at least 50%, (which is contrary to currently accepted thinking of the experts) and it can be a multiple of the thickness d of the material of the blade stump 6. The material thickness of blade stump 6 at the leading and trailing edges 3, 4 of the blade diminishes to zero. The height of the front surface 30 and the thus associated constant thickness of repair plate 7 are sufficient to suppress distortion of the edge regions of the blade. The width of the front surface 30 extends across the length of the separation cut 10 and projects therebeyond by as least 2 mm at leading edge 3 and trailing edge 4.

Based on the adherence of the pool between high front surface 30 and the comparatively low repair surface 31, there is formed a non-dropping or sagging melt-zone 23 as shown in FIG. 5. Based on this melt-zone 23, the weld seam solidifies toward the root and toward the weld seam surface to form a fillet-weld type weld bead 24, 25, whereby no additional filler material is necessary.

In this example, over the entire length of the weld seam, there is maintained a displacement of 75%±5% measurement tolerance, so that approximately 75% Of the arc root, which corresponds to the surface of the opening of the copper nozzle, is directed onto repair plate 7 and the remainder onto blade stump 6. Thus, 75% of the surface of the arc root heats the repair plate 7. The width of the weld zone is 4 to 6 mm in this example with the TPA keyhole welding method.

EXAMPLE 3

In this example, a laser-beam welding is utilized for the butt welding of the same structural parts as in Example 1, after a suitable bright metallic repair surface 31 has been produced on blade stump 6 by means of laser separation. Welding tests according to FIG. 2 do not yield satisfactory results in this process. First the arrangement according to FIG. 1a of the invention supplies a butt welding free of distortion, without weld filler, and without correspondingly shaped weld filler strips or edge pieces, as well as without shaped, form-stable supports for supporting the molten pool in the edge regions.

The excellent focusability of the laser beam makes possible a very concentrated introduction of energy and thus extremely narrow weld seams with a deep weld effect and a small heat load on the blade stump. Another advantage of the laser process is that the two laser processes of separation and welding can be applied in combination.

Helium is exclusively used in this example as the plasma gas. The gas is introduced coaxially to the laser beam. In addition, a protective gas is used, concentric to the plasma gas and a root gas, which protects the weld root. Argon or helium is used as the protective gas.

A lens with a 5-inch focal depth is used for focusing the laser beam. In this way, a maximum intensity of approximately 6 MW/cm$^2$ is obtained with a focal radius of 0.13 mm and an average output of approximately 2 kW of a $CO_2$ laser, and a welding speed of 20 mm/s is established. The pre-programmed welding path is, in this case, a substantially straight path with a lateral displacement of the laser beam of more than 75%, whereby more than 75% of the impact surface of the laser beam is directed onto repair plate 7 and the rest onto blade stump 6. At the leading and trailing edges, the displacement is somewhat greater than in the center of the blade profile. Thus, the displacement decreases in this example from leading edge 3 to the center of the blade by approximately 10% and increases from the center to the trailing edge by about 20%.

This lateral displacement is a critical adjustment parameter in the process of the invention according to FIG. 1a, since too great a lateral displacement could lead to bonding errors between the butt edges and the weld seam, and too small a lateral displacement could lead to a sagging of the melt pool, so that edge notches can form or breaking off of the weld pool can occur. With laser beam welding, in this example, a width of the welding zone of 1.5–2 mm is obtained and thus is smaller by at least a factor of 3 than in the case of TPA keyhole welding.

EXAMPLE 4

The same structural parts as in Example 1 are prepared for butt welding correspondingly by means of laser beam separation to form repair surface 30 on blade stump 6. An electron-beam welding process is used for butt welding the blade stump 6 to the repair plate 7.

An electron-beam welding unit of 30 kW with a maximum acceleration voltage of 150 kV is utilized for repair of the blades of the integral rotor disk. The processing chamber is evacuated up to a pressure of 50 mPa. The welding path is displaced laterally as in Example 3. The path displacement can be demonstrated as less critical an adjustment parameter in the case of electron-beam welding, if the welding is conducted with a defocused beam. The welding speed is 50 mm/s with beam output of 6.6 kW.

Laser-beam welding and electron-beam welding are characterized by a much narrower heat-affected zone as compared to TPA keyhole welding. Since, for example, it is known for Ti alloys that in stress-free annealing, which is conducted after the welding process in all examples, no complete breakdown of the intrinsic stresses induced by welding occurs, higher strength values are to be expected for the blades welded with laser-beam welding or electron-beam welding than for blades repaired with TPA keyhole welding, due to the smaller heat-affected zones.

TPA keyhole welding is the most cost-favorable welding process. The costs for laser-beam welding are again more favorable than those for electron-beam welding. The costs improve, however, with respect to the laser process, if separation and joining are combined into a total repair process according to the invention, since the separation of the damaged regions and the subsequent joinder of repair plate 7 is made possible without intermediate steps and can be conducted with the same device and with the same chuck mounting, so that the total time for the total repair is essentially shortened.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. A process for repairing a damaged blade of a turboengine comprising:

separating a damaged portion of a blade of a turboengine from the remainder of the blade to leave a stump of sound material having an exposed surface at which the damaged portion has been removed, abutting against said exposed surface of the blade stump, a repair plate of substantially constant thickness which exceeds by at least 50% a maximum profile height of the blade at said exposed surface, said repair plate being formed with a surface which abuts against said exposed surface of the blade stump along the length of the exposed surface butt welding said repair plate and said blade stump at the abutting surfaces thereof to join said repair plate of said blade stump by a welded joint, and machining the repair plate and the welded joint to form an outer surface which is smoothly continuous with an outer surface of the blade stump.

2. A process as claimed in claim 1, wherein the repair plate and the blade stump are butt welded by advancing a beam of energy along the abutting surfaces and wherein at least 55% of the beam is applied onto the repair plate and the remainder onto the blade stump.

3. A process as claimed in claim 2, further comprising transversely displacing said beam of energy, as the beam travels along said abutting surfaces, to effect the application of the relative amount of the beam of energy onto the repair plate and the blade stump along the length of the abutting surfaces.

4. A process as claimed in claim 1, comprising providing said repair blade with a thickness at least twice the maximum profile height of the blade stump.

5. A process as claimed in claim 1, comprising pre-shaping said repair plate so that said abutting surface of the repair plate conforms to said exposed surface of the blade stump.

6. A process as claimed in claim 1, wherein said blade has leading and trailing edges and said damaged portion is at least at one of said edges, said damaged portion being separated at said at least one of said edges such that said exposed surface of the blade stump forms an oblique angle with respect to a longitudinal axis of said blade, and abutting said repair plate against said exposed surface at said oblique angle.

7. A process as claimed in claim 1, wherein said blade has leading and trailing edges, said method further comprising forming the abutting surface of said repair plate in regions proximate the leading and trailing edges of the blade obliquely with respect to said regions.

8. A process as claimed in claim 1, wherein said butt welding comprises tungsten-plasma—arc welding (TPA) in the keyhole process.

9. A process as claimed in claim 8, wherein during said arc welding, a plasma arc is advanced along the abutting surfaces so that 55–100% of the arc is applied to the repair plate and the remainder to the blade stump.

10. A process as claimed in claim 1, wherein said butt welding comprises laser beam welding or electron beam welding.

11. A process as claimed in claim 10, wherein during said welding, an energy beam is advanced along the abutting surfaces so that 55–100% of the energy beam is applied to the repair plate and the remainder to the blade stump.

12. A process as claimed in claim 2, wherein said damaged portion of the blade is separated from the remainder of the blade along a surface extending transversely of the blade from a leading edge of the blade to a trailing edge of the blade, and wherein the portion of the beam of energy applied to the repair plate in regions at said edges is greater than the portion of the beam applied to the repair plate at a central region between said edges.

13. A process as claimed in claim 12, wherein the portion of the beam in regions at said edges is between 75% and 100% of the beam and between 55% and 80% in said central region.

14. A process as claimed in claim 2, comprising transversely displacing said beam of energy as the beam travels along said abutting surfaces by a tracking system which detects and automates said butt welding so that a predetermined portion of the beam is applied to the repair plate and the blade stump as the butt welding progresses along the welded joint.

15. A process as claimed in claim 1, wherein said damaged portion is separated from the remainder of the blade by advancing a laser beam along a line of separation and concurrently blowing off molten material formed at said line of separation.

16. A process as claimed in claim 15, wherein said blowing off of molten material comprises surrounding the laser beam with an inert gas of nitrogen or argon which blows off the molten material.

17. A process as claimed in claim 1, applied to repairing blades integral with a rotor disk.

18. A process as claimed in claim 1, applied to repairing blades secured to a rotor disk.

19. A process as claimed in claim 1, applied to repairing blades of a compressor of the turboengine.

20. A process as claimed in claim 2, wherein said butt welding of the repair plate and the blade stump is effected without introducing weld filler or insert pieces at the weld joint.

* * * * *